United States Patent [19]

Taylor

[11] 4,280,606

[45] Jul. 28, 1981

[54] TORQUE LIMITING DEVICE

[75] Inventor: Kenneth W. J. Taylor, Bletchley, England

[73] Assignee: Pennwalt Corporation, Philadelphia, Pa.

[21] Appl. No.: 42,641

[22] Filed: May 25, 1979

[30] Foreign Application Priority Data

May 8, 1979 [GB] United Kingdom ............... 15776/79

[51] Int. Cl.³ .............................................. F16D 7/02
[52] U.S. Cl. ................................ 192/56 C; 64/27 CT; 64/30 E; 192/81 C
[58] Field of Search ............ 192/56 C, 81 C; 64/2 R, 64/27 CT, 30 E, 30 D

[56] References Cited

U.S. PATENT DOCUMENTS

| | | | |
|---|---|---|---|
| 677,872 | 7/1901 | Locke | 192/81 C |
| 1,400,368 | 12/1921 | Manchester | 64/27 CT |
| 2,242,379 | 5/1941 | Wahl | 192/81 C |
| 2,796,101 | 6/1957 | Hasemann et al. | 64/2 R X |
| 3,727,732 | 4/1973 | Barr | 192/56 C X |
| 4,058,176 | 11/1977 | Fischer et al. | 64/2 R X |

Primary Examiner—Rodney H. Bonck

[57] ABSTRACT

Torque limiting device of simple 3-piece construction which reliably automatically disengages the driving and driven members when the latter is subjected to a predetermined overload. Device comprises a pair of cooperating coupling members which respectively engage the driving and driven members, and a helical compression spring interengaging the two coupling members. The direction of lay of the spring is selected in accordance with the direction of rotation of the output shaft of the driven member. Overloading the driven member increases the diameter of the spring which causes it to disengage itself from the driving coupling member to thus prevent torque from being transmitted to the driven member while overloaded.

4 Claims, 2 Drawing Figures

U.S. Patent  Jul. 28, 1981  4,280,606
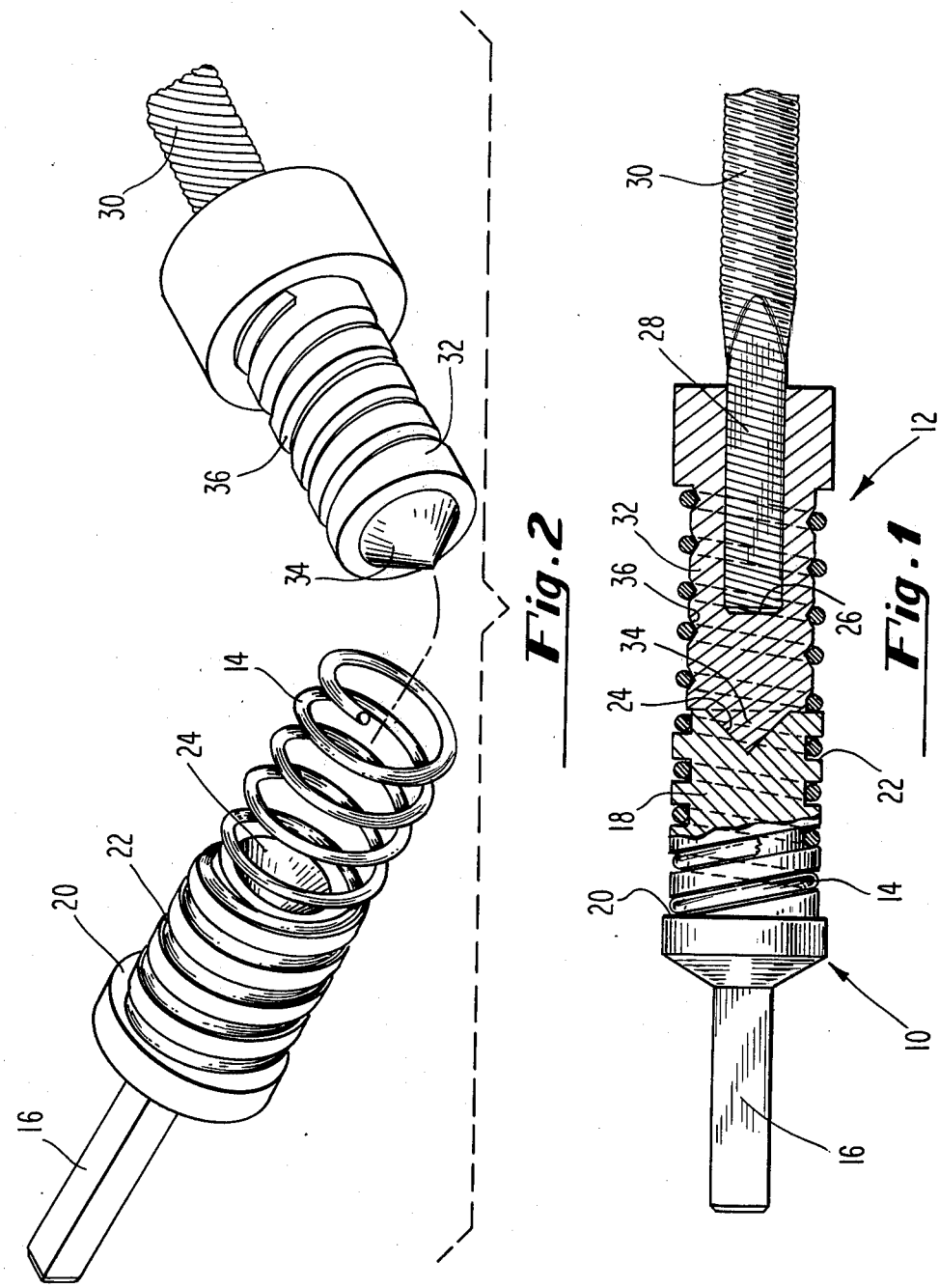

TORQUE LIMITING DEVICE

STATEMENT OF THE INVENTION

This invention relates to a drive clutch or torque limiting device which automatically slips when torque transmitted to a driven member from a driving member exceeds a predetermined value.

BACKGROUND AND SUMMARY OF THE INVENTION

Flexible shafts comprise basic elements of power transmission and are designed to transmit power or control from a driving element to an element to be driven. Transmission may be over, under, or around obstacles or objects where transmission by solid shafts would be impractical or impossible.

In a typical rotatable flexible shaft, a wire mandrel has a plurality of layers of closely coiled wire wound thereover, each of the layers being successively wound over another in alternately opposing directions, i.e., right or left-hand lay. This shaft is usually covered by a flexible casing, metallic or covered, and a clearance between the shaft and casing is provided in order that the shaft may rotate freely within the casing.

Rotatable flexible shafts are of two basic types—power driven and remotely controlled. Power driven flexible shafts are designed primarily for motor-driven or high speed operation in one direction. Remote control flexible shafts, on the other hand, are designed primarily for hand-operated control in either direction of rotation.

A power driven flexible shaft has maximum torque capacity when operated in the direction which tightens up its outermost layer of wires. When operated in the opposite direction, torque capacity is reduced by about 20 to 50%. Therefore, for clockwise driving, a left-lay shaft should be used. Alternatively, a right-lay shaft should be employed for counterclockwise driving.

The present invention contemplates a simple, inexpensive drive clutch or torque limiter for use with power driven flexible drive shafts to provide positive fail-safe control. The device is easy to maintain, lends itself to quick coupling, and provides an audible warning of slip condition when the driven member is overloaded.

BRIEF DESCRIPTION OF THE DRAWINGS

FIG. 1 is a longitudinal cross-sectional view of the drive clutch or torque limiting device of the invention.

FIG. 2 is a partially exploded perspective view of the device of FIG. 1.

DETAILED DESCRIPTION OF THE INVENTION

Referring to the drawings, a 3-component drive clutch or torque limiting device for use with power driven flexible shafts comprises a male coupling member 10, a female coupling member 12, and a compression spring 14 interengaging each of the coupling members. Male coupling 10 is provided with an outwardly extending male square 16 for insertion into a mating orifice of a power driven hand tool (not shown), for example, grass cutters, hedge trimmers, cultivators, drills, grinders, and the like. Means for retaining male square 16 in the power tool during operation thereof are well known and not herein shown or described. Male coupling 10 is additionally provided with a plug member 18 terminating at its inner end in a shoulder 20. Plug 18 is provided with a helical groove 22 for its entire length, the groove being of considerable depth for receiving and maintaining spring 14. A centered conical depression 24 is disposed in the outer end of plug 18.

Female coupling 12 is provided with a female square orifice 26 which penetrates a sufficient distance therewithin in order to receive an integrally formed square 28 of a flexible shaft 30. Integrally formed squares on flexible shafts are well known and are described, for example, in U.S. Pat. Nos. 3,481,156 and 3,485,079 of the assignee. The invention, of course, is not intended to be limited to square configurations only, although preferred. Female coupling 12 includes a plug portion 32 having a spigot, or centralizing cone 34, which is matingly received by bore or conical depression 24. Male square 16, conical depression 24, female square orifice 26, and centralizing cone 34 are axially disposed. Plug portion 32 of female coupling member 12 is provided with a helical groove 36 of shallow configuration, the pitch and lay of the helical grooves for both plug members being the same.

In assembling the present torque limiting device, spring 14 is screwed onto plug 18 of the male coupling member until an end of the spring abuts shoulder 20. The spring is of sufficient length to yet threadedly receive plug portion 32 of the female coupling member. Alignment of plug 18 and plug portion 32 is insured by registration between spigot or centralizing cone 34 and conical depression 24. The end of spring 14, which is seated in the shallow groove 36 of the female coupling is not restrained, as opposed to the restraint offered by shoulder 20 to the other end of spring 14. Spring 14 is pitched so as to constantly urge centralizing cone 34 into tight engagement with conical depression 24.

In operation, assume the driven power tool is to be used in such a manner that its output shaft rotates in a clockwise direction. Thus, flexible shaft 30 will be provided with a left lay, i.e., the outermost layer of wires will tighten when the flexible shaft is rotated in a clockwise direction; and spring 14 will be provided with a right lay, i.e., its diameter will increase when urged to rotate in a clockwise direction when one end is in abutting relationship with shoulder 20. Now, as torque progressively increases upon transmission thereof from the driving member to the power tool, the diameter of spring 14 will also progressively increase, and the spring will tend to lift out from the shallow groove 36 disposed around the female coupling member. I have discovered that the spring will initially lift out of the shallow groove at the interface area of the coupling members before finally snapping out entirely from the shallow groove if torque is of sufficient magnitude. So long as the torque continues to exceed a predetermined limit, the spring will slide over the plug portion 32 while emitting an audible clicking sound each 360° of revolution of the female coupling member, the clicking sound occurring when the spring "clicks back" into the groove. Of course, the spring will re-seat itself in groove 36 when the load on the driven member is sufficiently reduced. Regardless of load, there is little relative movement between plug 18 of male coupling member 10 and spring 14. Plug portion 32 is desirably surface hardened for maximum wear resistance.

Infinite predetermined torque ratings may be obtained by control of certain variables. For example, in spring 14: type, size, and cross-section of the wire used, spring pitch, length and amount of spring governing slipping friction; in plug portion 32: type of material and its coefficient of friction, groove diameter and outside diameter of the plug portion, and the like.

The invention has been described for use with flexible shafts. There may be applications where rigid connections or members may be used in lieu thereof and such non-flexible means are intended to fall within the scope of the invention. Further, it is understood that the flexible drive shaft employed and described herein may be protected by a flexible casing, as is well known in the art, and that the use of end fittings, adapters, ferrules, and the like, associated with conventional flexible shaft applications are contemplated by the present invention.

I claim:

1. A torque limiting device for use with a driving member and a member to be driven thereby, said device comprising
    a first coupling member in engagement with said driven member,
    a second coupling member in engagement with said driving member,
    spring means tightly interengaging said coupling members for urging contact therebetween such that rotation of said second coupling member produces a similar rotation to said first coupling member,
    said spring means being so arranged about said coupling members and adapted for use therewith that rotation of said driven member upon increased loading thereof produces an increase in diameter of said spring means to thereby effect disengagement thereof from said second coupling member, said first coupling member including
    a male square at one end thereof for engaging said driven member,
    a plug at other end of said first coupling member, said plug terminating in a shoulder disposed intermediate said male square and plug, and
    a deep helical groove provided around said plug; and wherein said second coupling member includes
    a non-circular orifice for receiving a mating part of rotatable means for rotating said second coupling member,
    a plug portion, said plug portion disposed in opposed face-to-face relationship with said plug of said first coupling member,
    a shallow helical groove provided around said plug portion; and wherein
    said spring means is a compression spring seated within said grooves of said plug and plug portion, one end of said spring abutting said shoulder of said first coupling member.

2. The device of claim 1 wherein one of said plug and plug portion is provided with a central conical depression and other of said plug and plug portion is provided with a centralizing conical protrusion registrable with said conical depression.

3. The device of claim 2 further characterized by said rotatable means being a rotatable flexible shaft, said flexible shaft comprising
    a mandrel, and
    a plurality of layers of closely coiled wire wound over said mandrel, each of said layers of wire being successively wound over another in alternately opposing directions such that outermost layer of said wire is provided with a left lay whereby said outermost layer is tightened when said first coupling member is caused to rotate in a clockwise direction,
    said compression spring having a right lay, and
    said grooves in said plug and plug portion having a pitch consistent with said right lay of said spring.

4. The device of claim 2 further characterized by said rotatable means being a rotatable flexible shaft, said flexible shaft comprising
    a mandrel, and
    a plurality of layers of closely coiled wire wound over said mandrel, each of said layers of wire being successively wound over another in alternately opposing directions such that outermost layer of said wire is provided with a right lay whereby said outermost layer is tightened when said first coupling member is caused to rotate in a counterclockwise direction,
    said compression spring having a left lay, and
    said grooves in said plug and plug portion having a pitch consistent with said left lay of said spring.

* * * * *